United States Patent [19]
Marriott

[11] 3,735,475
[45] May 29, 1973

[54] METHOD OF MANUFACTURING VENTED LINED PIPE

[75] Inventor: Lee Walter Marriott, Midland, Mich.

[73] Assignee: The Dow Chemical Company, Midland, Mich.

[22] Filed: Oct. 8, 1971

[21] Appl. No.: 187,822

Related U.S. Application Data

[60] Continuation of Ser. No. 870,915, Aug. 19, 1969, abandoned, which is a division of Ser. No. 681,829, Nov. 9, 1967, Pat. No. 3,506,039.

[52] U.S. Cl..................................29/455, 29/516
[51] Int. Cl..................B21d 39/00, B23p 19/04
[58] Field of Search......................29/455, 516, 517; 138/114, 148

[56] References Cited

UNITED STATES PATENTS

| 2,386,747 | 10/1945 | Ris....................................29/455 UX |
| 3,315,348 | 4/1967 | Donovan et al. ....................29/516 X |

*Primary Examiner*—Charlie T. Moon
*Attorney*—Griswold & Burdick and Waterman and Ingraham

[57] ABSTRACT

Lined pipe is conveniently and safely vented by providing a plurality of spaces disposed between the lining and the pipe and venting gases at the terminal portions of the pipe section either to another section or to a gas dispersal facility.

1 Claim, 8 Drawing Figures

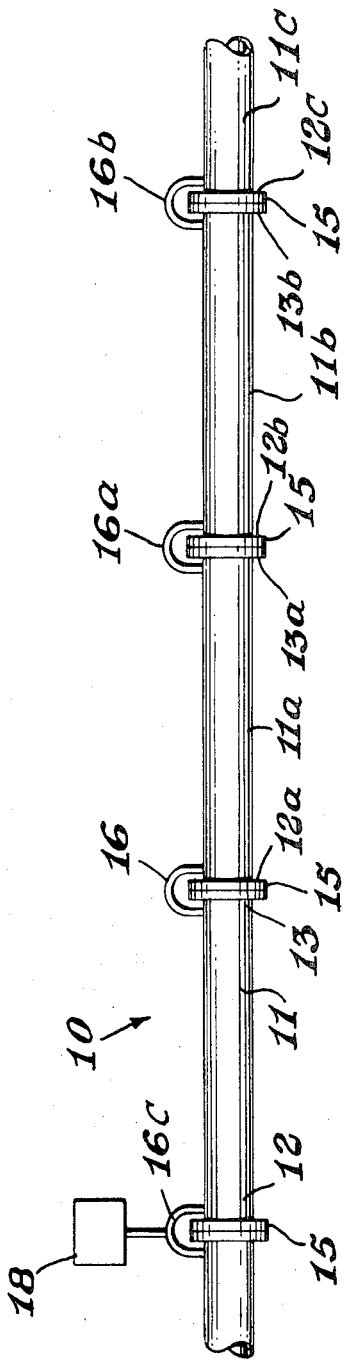
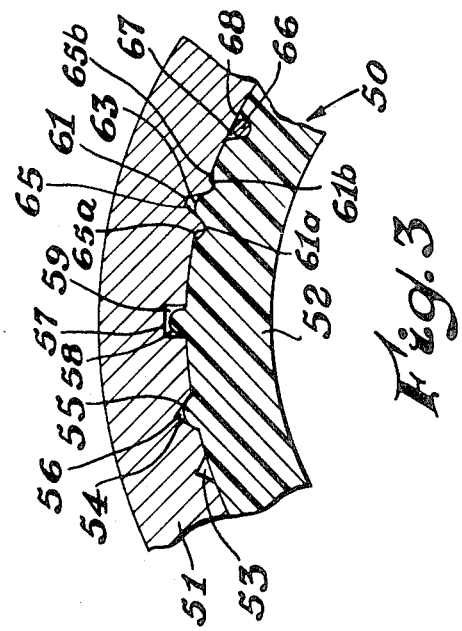
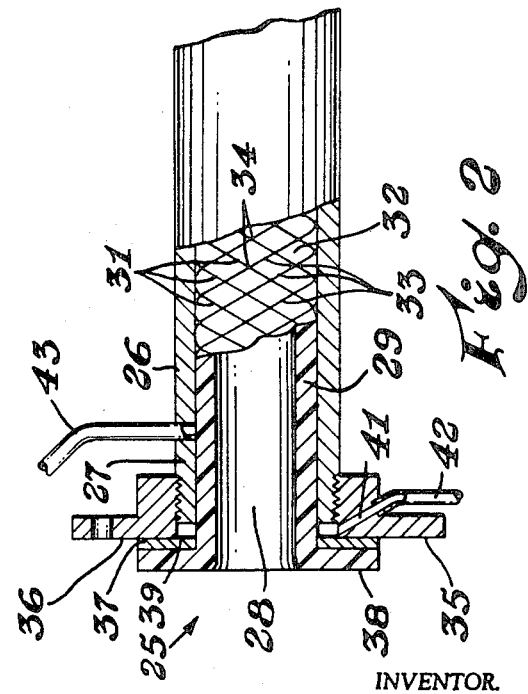
INVENTOR.
Lee Walter Marriott
BY
AGENT

METHOD OF MANUFACTURING VENTED LINED PIPE

This application is a continuing application of my copending application Ser. No. 870,915, filed Aug. 19, 1969, now abandoned, which in turn was a divisional application of my prior application Ser. No. 681,829, filed Nov. 9, 1967, now U.S. Pat. No. 3,506,039.

This invention relates to the venting of lined pipe or conduit, and more particularly relates to a method for disposing of gases or fluids which permeate organic linings of rigid pipes.

In the handling of many gases, liquids and fluid systems, it has been found desirable to employ lined pipe; that is, pipe having a rigid outer casing, such as steel, and a thermoplastic, thermoset or rubber liner disposed therein in such a manner that the material being conveyed by the lined pipe does not directly contact the material of the rigid shell, such as steel. Such pipe or conduit has found wide acceptance in chemical processing industries wherein materials of a corrosive nature are frequently conveyed by piping systems. Lined pipe is available in a wide variety of sizes and with many organic lining materials employed which are chemically resistant to various environments. Usually, such lined pipe comprises an outer conduit generally of steel into which there has been inserted by one means or another a chemically resistant synthetic liner prepared from materials such as polytetrafluoroethylene, vinylidene chloride-vinyl chloride polymers, polyether polymers, phenolic resinous polyolefin liners and the like. Such synthetic lining materials although highly resistant to corrosion are permeated by various gases and liquid vapors to a very minor extent. However, where a lined piping system is operated under varying pressure and/or is subjected to wide temperature differences, permeating gases or vapor may cause separation of the liner from the pipe, and at times collapse and rupture of the liner. In order to alleviate this difficulty, much of the pipe lined with organic resinous liners is provided with a series of vent holes perforating the metal wall of the pipe, thereby providing an escape route for the minor quantities of material which pass through the lining. Such vent holes are usually provided on about 18 inch to 36 inch centers along the lined pipe to assure that no significant buildup of gas or fluid occurs between the inner wall of the pipe and the exterior wall of the liner which would promote collapse. If such pipe is subjected to unexpected temperatures or pressures, rupture of the liner in the region of such vent holes may occur which can result in what might be considered as a sprinkler system distributing corrosive, toxic and other noxious materials in undesired locations. In order to overcome such difficulties, a corrosion-proof venting system may be provided wherein each vent hole is connected to a header system which generally parallels the lined pipe assembly, and is vented to a more or less safe location. Such venting systems are relatively complex and are installed usually only after the expenditure of a considerable amount of time, effort and with the cost of a relatively large amount of material.

It would be desirable if there were available an improved method for venting a lined pipe system.

It would also be beneficial if there were available an improved lined pipe which did not require a plurality of vent holes disposed along its length.

It would also be beneficial if there were available an improved method for the preparation of lined pipe or conduit having a rigid outer casing and an organic, chemically resistant liner.

These benefits and other advantages in accordance with the present invention are achieved in a lined conduit, the lined conduit comprising a generally rigid outer casing having a first end and a second end, the casing defining a passageway extending from the first end to the second end, a liner comprising a layer of a synthetic chemically resistant lining material disposed within the passageway and generally conforming thereto in size and dimension and extending from the first end to the second end of the casing, the improvement which comprises providing at least one fluid passage disposed between the conduit and the liner, the fluid passage extending from the first end to the second end of the conduit.

Also contemplated within the scope of the invention is an improved method of fabricating lined conduit or pipe which comprises supplying an elongate casing having a first end and a second end and defining a longitudinal passageway therein, disposing within the casing an organic, chemically resistant liner generally coextensive with the passageway within the casing, the improvement which comprises providing at least one fluid passage extending from the first end to the second end of the casing, the passage being disposed between the liner and the casing.

Further features and advantages of the present invention will become more apparent from the following specification taken in connection with the drawing wherein:

FIG. 1 schematically depicts a piping system fabricated in accordance with the present invention.

FIG. 2 schematically depicts a sectional view of one embodiment of a lined pipe in accordance with the present invention.

FIG. 3 depicts a cross-sectional view of a portion of lined pipe in accordance with the invention having a plurality of longitudinal passages therein.

Figure 4:
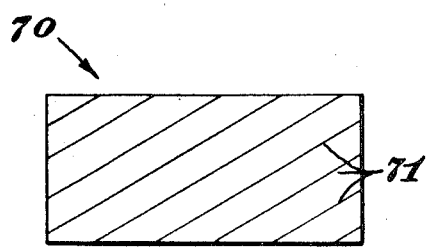
FIGS. 4 and 5 depict a schematic planar development of portions of lined pipes in accordance with the invention.

In FIG. 1 there is depicted a schematic fractional representation of a piping system in accordance with the invention generally designated by the reference numeral 10. The system 10 comprises a plurality of elongate lined conduits 11, 11a, 11b and 11c. The conduit 11 has a synthetic organic liner, not shown, a first end 12 and a second end 13. The remaining conduits have equivalent portions designated by like reference numerals and carrying the suffix a, b or c. The first and second ends of the conduits are secured together in mating sealing relationship by means of flange or connecting assemblies 15. The conduits 11, 11a, 11b and 11c have passages disposed between the liner and the pipe or casing. The passages of conduits 11 and 11a are connected by means of a conduit 16, whereas similar passages within conduits 11a and 11b are connected by a conduit 16a, and between conduits 11b and 11c by a conduit 16b. A conduit 16c is in operative communication with passages disposed between the liner and the pipe at the first end 12 of the conduit 11. The conduit 16c is in communication with a means 18 adapted to vent or otherwise dispose of undesirable fluids. In the assembly as depicted in FIG. 1, each of the conduits has a plurality of passages between the liner and the pipe or casing. These passages are all in communication with the means 18 by essentially a series connection provided by the conduits 16, 16a, 16b and 16c.

In FIG. 2 there is depicted a schematic sectional representation of a lined conduit in accordance with the invention generally designated by the reference numeral 25. The conduit 25 comprises a rigid casing, conduit or pipe 26 having a first end 27 and a second end, not shown. The conduit 25 defines an internal passageway 28 extending from the first end to the second end. Within the passageway 28 is disposed an organic, chemically resistant liner 29 prepared from materials such as a synthetic thermoplastic resin composition, a synthetic thermosetting resin composition or a rubber. A first series of generally helical passages 31 are defined between the liner 29 and an inner surface 32 of the conduit 25. A second series of generally helically disposed passages 33 are defined between the surface 32 and the liner 29. The passages 31 and 33 intersect at a plurality of locations 34. A flange or connecting means 35 is rigidly affixed to the casing 26 adjacent the first end 27. The flange 35 has a generally radially extending face 36. Remotely disposed from the second end 27 of the conduit 25, a gasket 37 is disposed on the face 36. An integral liner flange 38 extends radially outwardly parallel to the face 36 and the gasket 37. An annular space 39 is defined between the terminal portion of the casing 26, the flange 35, the gasket 37 and the liner 29. The annular space 39 is in communication with the passages 31 and 33. A vent passage 41 provides communication between the annular space 39 and a vent conduit 42 adapted to conduct gases into or away from the annular passage 39. A second vent conduit 43 provides communication between the passages 31 and 33 and space external to the pipe. If the rate of gas flow is relatively low, a vent conduit such as the conduit 43 is employed. If the rate of gas flow is relatively high, the arrangement of the vent passage 41 and the conduit 42 is preferred.

In FIG. 3 there is schematically depicted a cross-sectional view of a lined conduit generally designated by the reference numeral 50. The lined conduit 50 comprises an outer wall or casing 51 of a rigid material such as metal and a liner 52. A first passage 53 formed by grooving the surface of the conduit 51 adjacent the liner 52 is shown. The configuration of the passage 53 is generally triangular in that a triangular groove has been formed in the conduit wall and no flow of the liner 52 has occurred to restrict the passage. A second groove 54 is formed in the conduit 51. A ridge 55 of material of the liner 52 extends partially into the groove 54 and a passageway 56 is defined between the ridge 55 and the groove 54 resulting from flow of a portion of the liner under pressure into the groove. The groove 54 has a "V" configuration. A square groove 57 is formed in the conduit 51 and a ridge 58 projects therein. The ridge and square groove serve to define a passageway 59. A groove 61 having a generally U-shaped configuration is formed in the pipe wall 51 by the application of pressure thereto by a roller resulting in adjacent ridges 61a and 61b. A ridge 63 of the liner 52 projects inwardly into the groove and forms a passageway 65. Passages 65a and 65b are defined adjacent the ridges 61a and 61b, respectively. A small elongate body 66 such as a wire is disposed between the conduit 51 and the liner 52 and defines passageways 67 and 68 on either side thereof after flow of the liner under internal pressure about a major portion of the wire.

Conduits in accordance with the present invention are readily prepared by conventional pipe lining means wherein a preformed liner is positioned within a preformed pipe by the process of stretching a liner having an outer diameter slightly greater than the inside diameter of the pipe, inserting the liner, allowing the liner to retract and attempt to achieve its original diameter, the liner thereby being frictionally held within the pipe, or alternately, by positioning a preformed liner within a ductile metal pipe and swaging the ductile pipe about the liner. Another method which may be employed is that of extruding a synthetic resinous liner within a metal pipe or conduit and subsequently cooling the lining material to a solid state.

Regardless of the method of assembling the combination of the outer metal pipe and liner of the organic, chemically resistant material, provision must be made for the formation of a vent passage or passages between the liner and the pipe. FIG. 3 depicts a variety of such passages. For example, the passage 53 results from the formation of a V-groove on the inner surface of the metal conduit and the inclusion of an organic, chemically resistant liner in such a manner that the liner is not deformed or caused to cold flow partially into the groove. Cold flow into a V-groove is indicated by the ridge 55 of FIG. 3 wherein the liner has been subjected to sufficient pressure to cause a portion of the groove to be blocked by the ridge 55. However, as the groove narrows, it becomes much more difficult for a thermoplastic lining material to completely fill the groove at a temperature below its thermoplastic or melt temperature, and thus, a passageway such as the passageway 56 is assured if the service conditions of the lined conduit are maintained within predetermined conditions of temperature and pressure dependent, of course, on the particular characteristics of the liner material.

A generally square or rectangular groove 57 provides conditions which permit a fluid passageway 59 to remain between the ridge of liner material 58 and the wall of the groove 57. In an extreme case where the liner 58 would contact the bottom of the groove, two generally parallel passages are formed. Grooves are readily formed in the conduit by the use of a suitable cutting tool drawn therethrough in a manner similar to forming grooves in a rifle barrel. Alternately, if the conduit is formed from flat material which is subsequently formed to a cylindrical form and welded, the grooves may be preformed prior to forming of the flat strip into a conduit and subsequent formation of a side seam by welding.

A particularly beneficial form of groove is the groove 61 which is formed by means of a roll or similar tool pressed against the inner surface of the pipe with a force sufficient to cause displacement of a portion of the metal. Such a displacement forming technique gives rise to ridges adjacent the groove and oftentimes in the finished pipe permits the formation of at least one and possibly three passageways.

In the formation of any of the grooves depicted in FIG. 3, by offsetting a plurality of tools on a common support from the intended direction of travel, helical grooves are obtained; or if the tools are aligned along the axis of travel, straight grooving results. By employing a tool support or pig having a second similar pig pivotally affixed thereto wherein the first pig has tools aligned for right hand grooves and the second pig has tools aligned for left hand grooves, a double helical pattern such as that depicted in FIG. 2 is obtained.

Suitable passages between the liner and the inner wall of the pipe are also obtained by disposing a plurality of elongate rigid elements on the outer surface of the liner prior to incorporation within the tube such as a plurality of wires arranged in any desirable pattern. Alternately, elongate elements such as wires may be positioned within the tube to be lined and the liner added by extrusion, swaging or the stretching and relaxing process hereinbefore mentioned.

The technique of employing wires is particularly beneficial wherein the casing or pipe is a metal that is worked with difficulty or wherein the weight of the finished lined pipe is to be maintained at a minimum. The longitudinally extending passageways permit flow of gases which permeate through the plastic liner along the entire length of the pipe and permit vastly simplified venting arrangements such as depicted in FIG. 1.

The dimensions of the passages between the liner and the pipe are readily determined from a consideration of the permeability of the liner material to the materials which will be handled in a piping system prepared from such lined pipe. Thus, if the maximum operating temperature, pressure, the permeability of the liner material to a gas or fluid to be conveyed, together with the area of the liner are known, the volume of permeant gas per unit time passing through the liner is readily calculated. Knowing the volume of gas to be handled and the allowable pressure drop along a vented line, the total cross-sectional area of the passages can be determined.

The effect of cold flow or deformation of the liner is readily determined employing a small block of metal having a flat surface and a plurality of generally parallel grooves of varying size and configuration formed therein. A flat piece of liner material is placed on the grooved surface of the block and the liner material and block pressed together under a pressure usually equal to or exceeding the maximum pressures to be encountered in the service of such a lined pipe, and the liner material-metal block assembly, under compression, subjected to a temperature equal to or slightly above maximum temperature to be reached under operating conditions. As the creep or cold flow characteristics of most resinous materials are known or readily determined, a suitable test time is selected. At the end of the predetermined test time, an edge portion of the metal block and the plastic liner material, still under pressure, is carefully removed by a technique such as by an end mill utilizing a light cut and milling in such a manner that the direction of the cut is from the metal to the liner material (to prevent smearing of the liner material over the passages). A particularly advantageous material to use for the metal block is magnesium because of its ready machinability. Examination and measurement of the freshly milled surface in the region of the grooves indicates the amount of flow of the liner material into the grooves and the size of the gas passage in the groove thereby indicating the suitability of the particular liner material for service under such temperatures and pressures. Calculation of the number and size of grooves which should be employed in a pipe of any particular size and length is then readily accomplished. Wire placed between the metal block and the liner provides similar information.

Employing the foregoing test, the suitability of any particular liner-groove combination for a particular type of service is readily determined for a liner material that is substantially inert to the materials to be handled in the finished pipe. Generally, it is desirable to provide a total cross-sectional area of groove somewhat greater than that indicated by the foregoing procedure in order to allow for partial plugging of the grooves over a period of time by corrosion and to assure operability of the system if the design conditions have been exceeded in service.

In FIG. 4 there is depicted a flat development 70 of a portion of a conduit having a plurality of grooves 71 formed on the inner surface thereof which provides a multi-groove helical pattern.

Figure 5:
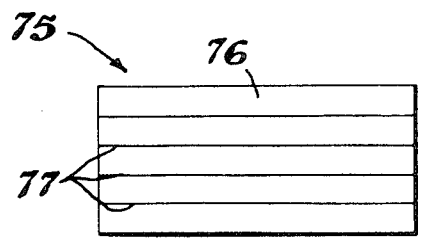

FIG. 5 depicts a flat development 75 of a conduit showing an inner surface 76 having a plurality of longitudinal parallel grooves 77.

The particular choice of pattern of passages between the liner and the pipe is dependent somewhat on the surface. For most applications, the double helical pattern offers some significant advantage particularly when formed by grooving the outer conduit in that a mechanical locking action is provided between the liner and the pipe as well as providing many paths which a permeant gas may follow due to the large number of intersections between the helical passages of opposite hand. The double helical pattern offers substantial advantage where localized corrosion might exist. The single helical pattern of FIG. 4 is beneficial in that it is more easily formed than the double helical pattern and is of benefit where minimal corrosion may be expected, and provides considerable resistance to longitudinal motion of the liner within the pipe. The pattern of parallel grooves lying on a cylindrical surface which is obtained from the arrangement of FIG. 5 permits relatively easy insertion of a close fitting liner for applications where corrosion is expected to be minimal or nonexistent. Advantageously, the double helical configuration permits venting by inserting a venting conduit through almost any portion of the wall of the pipe which contacts any one of the helical grooves or contacts an intersection of the helical grooves. The patterns of FIGS. 4 and 5 require end venting.

Figure 6:
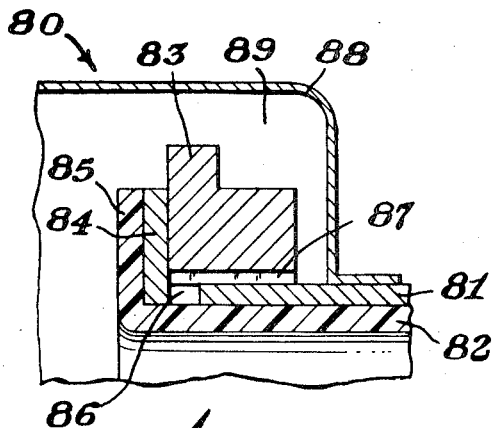
FIGS. 6, 7 and 8 depict alternate means of providing passages for fluids flowing between a pipe and its liner.

In FIG. 6 there is depicted a fractional schematic arrangement of a portion of a conduit joint generally designated by the reference numeral 80. A conduit 81 is provided with a flanged, chemically resistant, organic liner 82. A flange 83 is affixed to the terminal end of the conduit and a gasket 84 is disposed between the flange 83 and a flange 85 of the liner 82. An annular space 86 in communication with a plurality of passageways between the pipe 81 and the liner 82 is defined by the liner 82, the conduit 81, the gasket 84 and the flange 83. A slot 87 formed in the flange 83 provides communication between the annular space 86, the space exterior to the conduit 81. A joint enclosure 88 is shown in sealing engagement with the conduit 81 and defines an internal hermetically sealed space 89 about a joint between adjacent pipes. For the sake of clarity, connecting means for the flange 83 with a similar flange have been omitted. Thus, in the embodiment depicted in FIG. 6, permeant gas may pass through the liner 82, into the passageways not shown between the liner 82 and the pipe 81, into the annular space 86, through the slot 87, into the space 89. Employing a like arrangement in engagement with the flange 85, the permeant gases would flow from the space 89, through a slot equivalent to the slot 87, into an annular space equivalent to the space 86 and between the liner and the pipe in the passages provided.

Figure 7:
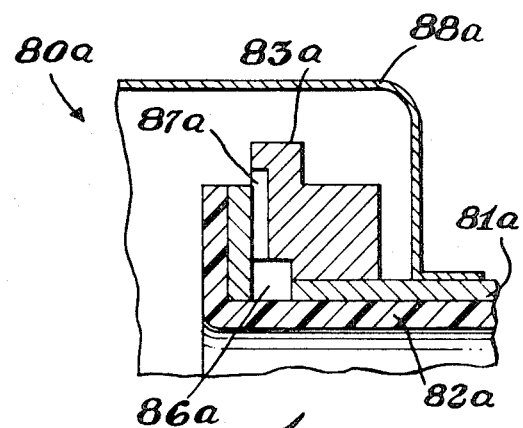

In FIG. 7 there is shown an alternate arrangement similar to FIG. 6 designated as 80a comprising a liner 82a, a conduit 81a, an enclosure 88a and a flange 83a. The flange 83a defines a slot 87a which is functionally equivalent to the slot 87 of FIG. 6.

Figure 8:
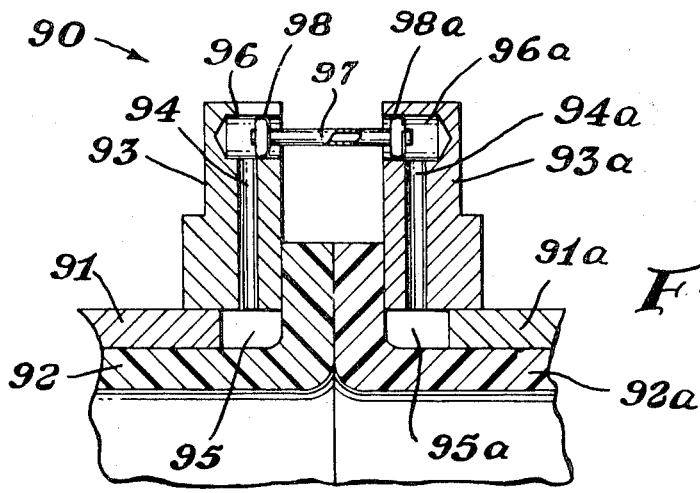

In FIG. 8 there is depicted a schematic fractional view of a joint between adjacent pipe sections generally indicated by the reference numeral 90. The joint 90 comprises a first conduit 91 and a second conduit 91a. The conduits 91 and 91a have disposed therein flanged synthetic resinous liners 92 and 92a, respectively. The conduits 91 and 91a have disposed thereon terminal flanges 93 and 93a, respectively, which define internal generally radial passageways 94 and 94a, respectively. Terminal annular passages 95 and 95a are in communication with the passageways between the conduits and the liners in a manner similar to the annular passageways of FIGS. 2, 6 and 7. The passageways 94 and 94a terminate in plenums or chambers 96 and 96a. Remote from the conduit, the plenums 96 and 96a are in full communication by means of a conduit 97 passing therebetween. The conduit 97 is sealed within the plenum 96 by means of an O-ring 98 and within the plenum 96a by means of an O-ring 98a. For the sake of clarity, connecting bolts or clamps have been omitted.

The embodiment of FIG. 8 is particularly advantageous wherein the liner is required to be installed in a minimum space and the venting system requires relatively high mechanical protection.

As is apparent, a wide variety of means may be employed to convey gases from the passages formed between the pipe and the liner to an adjacent section of similar lined pipe or to a suitable disposal means such as a stack, absorber or the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for fabricating lined conduit or pipe suited for the handling of materials of a corrosive nature under pressure, the method comprising supplying an elongate ductile metal casing having a first end and a second end and defining a longitudinal passage therein, providing a plurality of grooves extending from the first end to the second end of the casing on an inner wall of the casing, disposing within the casing a synthetic resinous organic chemically resistant liner subject to cold flow, the liner being generally coextensive with the passage within the casing, swaging the ductile metal casing about the liner whereby a plurality of passageways are defined by the liner and the casing, the passageways extending from the first end to the second end, the passages being of such a size that cold flow of the liner under service conditions does not close the passages.

* * * * *